United States Patent
Pineiro et al.

(10) Patent No.: US 9,790,383 B2
(45) Date of Patent: Oct. 17, 2017

(54) MARKING SYSTEM

(71) Applicant: Crayola LLC, Easton, PA (US)

(72) Inventors: Luis Rodrigo Pineiro, Easton, PA (US); Robert Nicholas Amabile, Bangor, PA (US)

(73) Assignee: CRAYOLA LLC, Easton, PA (US)

(*) Notice: Subject to any disclaimer, the term of this patent is extended or adjusted under 35 U.S.C. 154(b) by 0 days.

(21) Appl. No.: 15/250,122

(22) Filed: Aug. 29, 2016

(65) Prior Publication Data

US 2016/0362571 A1    Dec. 15, 2016

Related U.S. Application Data

(62) Division of application No. 14/551,647, filed on Nov. 24, 2014, now Pat. No. 9,464,185.

(60) Provisional application No. 61/908,556, filed on Nov. 25, 2013.

(51) Int. Cl.

| | | |
|---|---|---|
| B41M 5/128 | (2006.01) | |
| C09D 9/00 | (2006.01) | |
| C09D 11/50 | (2014.01) | |
| C09D 171/02 | (2006.01) | |
| C09D 11/17 | (2014.01) | |
| C08K 5/17 | (2006.01) | |
| B41M 5/323 | (2006.01) | |
| B41M 5/337 | (2006.01) | |
| C09D 11/03 | (2014.01) | |
| C09D 11/16 | (2014.01) | |
| B41M 5/124 | (2006.01) | |
| B41M 5/136 | (2006.01) | |
| B41M 5/155 | (2006.01) | |
| C08K 5/00 | (2006.01) | |

(52) U.S. Cl.
CPC ............ *C09D 11/17* (2013.01); *B41M 5/128* (2013.01); *B41M 5/1246* (2013.01); *B41M 5/136* (2013.01); *B41M 5/155* (2013.01); *B41M 5/323* (2013.01); *B41M 5/3375* (2013.01); *C08K 5/17* (2013.01); *C09D 9/00* (2013.01); *C09D 11/03* (2013.01); *C09D 11/16* (2013.01); *C09D 11/50* (2013.01); *C09D 171/02* (2013.01); *B41M 2205/04* (2013.01); *B41M 2205/16* (2013.01); *B41M 2205/18* (2013.01); *C08K 5/0091* (2013.01)

(58) Field of Classification Search
CPC ..... B41M 5/128; B41M 2205/18; C09D 9/00; C09D 11/50; C09D 171/02
USPC ...................... 503/205; 106/31.23
See application file for complete search history.

(56) References Cited

U.S. PATENT DOCUMENTS

| | | |
|---|---|---|
| 3,745,672 A | 7/1973 | Duskin |
| 3,769,045 A | 10/1973 | Maierson |
| 3,772,052 A | 11/1973 | Kimura |
| 3,864,146 A | 2/1975 | Oda |
| 3,957,495 A | 5/1976 | Teranishi |
| 4,012,538 A | 3/1977 | Miyamoto |
| 4,186,243 A | 1/1980 | Astbury |
| 4,199,618 A | 4/1980 | Golden |
| 4,244,604 A | 1/1981 | Fraser |
| 4,245,857 A | 1/1981 | Satomura |
| 4,263,047 A | 4/1981 | Myamoto |
| 4,289,332 A | 9/1981 | Kato |
| 4,339,275 A | 7/1982 | Tutty |
| 4,372,582 A | 2/1983 | Geisler |
| 4,374,671 A | 2/1983 | Hayashi |
| 4,525,214 A | 6/1985 | Panken |
| 4,571,415 A | 2/1986 | Jordan |
| 4,576,649 A | 3/1986 | Oliver |
| 4,601,920 A | 7/1986 | Mitsuo |
| 4,631,204 A | 12/1986 | Mitsuo |
| 4,675,706 A | 6/1987 | Miller |
| 4,748,147 A | 5/1988 | Sumi-i |
| 4,826,807 A | 5/1989 | Shimomura |
| 4,833,119 A | 5/1989 | Umeda |
| 4,835,134 A | 5/1989 | Umeda |
| 4,840,927 A | 6/1989 | Sano |
| 4,877,767 A | 10/1989 | Liang |
| 4,880,766 A | 11/1989 | Miller |
| 4,960,749 A | 10/1990 | Miura |
| 4,978,390 A | 12/1990 | Snedeker |

(Continued)

FOREIGN PATENT DOCUMENTS

| | | |
|---|---|---|
| EP | 0017889 | 10/1980 |
| EP | 0610739 | 8/1994 |

(Continued)

OTHER PUBLICATIONS

Great Britain Search Report dated Feb. 13, 2015 for Application No. GB1420866.4, 6 pages.
Fred Omega Garces, "EDTA Tiration", Jun. 12, 2012, 25 pages.
Non Final Office Action for U.S. Appl. No. 14/551,647, dated Mar. 21, 2016, 12 pages.
Non Final Office Action for U.S. Appl. No. 14/8551,647, dated Mar. 30, 2016, 8 pages.
Notice of Allowance for U.S. Appl. No. 14/551,647, dated Jun. 28, 2016, 6 pages.

(Continued)

*Primary Examiner* — Bruce H Hess
(74) *Attorney, Agent, or Firm* — RatnerPrestia

(57) ABSTRACT

A marking system comprises a substrate having a surface coated with a color-triggering developer and a deactivating ink composition; and a marking composition comprising at least one color precursor. At least one "non-color developing portion" of the surface is coated with both the color-triggering developer and the deactivating ink composition, and at least one "color-developing portion" of the surface is coated with the color-triggering developer and is not coated with the deactivating ink composition. Color development occurs at the color-developing portion(s) and does not occur at the non-color developing portion(s) upon application of the marking composition to the surface of the substrate.

10 Claims, No Drawings

(56) References Cited

U.S. PATENT DOCUMENTS

| | | |
|---|---|---|
| 5,008,237 A | 4/1991 | Liang |
| 5,017,546 A | 5/1991 | Brinkman |
| 5,030,281 A | 7/1991 | Miller |
| 5,034,370 A | 7/1991 | Saeki |
| 5,057,154 A | 10/1991 | Kusakaa |
| 5,084,492 A | 1/1992 | Pinell |
| 5,116,410 A | 5/1992 | Miller |
| 5,131,776 A | 7/1992 | Mott |
| 5,137,797 A | 8/1992 | Nakamura |
| 5,178,949 A | 1/1993 | Sakamoto |
| 5,232,494 A | 8/1993 | Miller |
| 5,276,075 A | 1/1994 | Santini |
| 5,288,160 A | 2/1994 | Li |
| 5,290,068 A | 3/1994 | Gundjian |
| 5,326,388 A | 7/1994 | Miller |
| 5,326,739 A | 7/1994 | Tanabe |
| 5,383,954 A | 1/1995 | Craig |
| 5,388,689 A | 2/1995 | Kroop |
| 5,389,717 A | 2/1995 | Santini |
| 5,393,332 A | 2/1995 | Saito |
| 5,447,901 A | 9/1995 | Yamaguchi |
| 5,456,743 A | 10/1995 | Fry |
| 5,460,647 A | 10/1995 | Snedeker |
| 5,462,597 A | 10/1995 | Jubran |
| 5,464,470 A | 11/1995 | Brachman |
| 5,485,792 A | 1/1996 | Keyse |
| 5,486,228 A | 1/1996 | Miller |
| 5,489,331 A | 2/1996 | Miller |
| 5,492,558 A | 2/1996 | Miller |
| 5,498,282 A | 3/1996 | Miller |
| 5,503,665 A | 4/1996 | Miller |
| 5,647,896 A | 7/1997 | Nishimura |
| 5,814,579 A | 9/1998 | Dotson |
| 5,824,715 A | 10/1998 | Hayashihara |
| 5,846,901 A | 12/1998 | Jubran |
| 6,124,377 A | 9/2000 | Kaiser |
| 2003/0054298 A1 | 3/2003 | Suzuki |

FOREIGN PATENT DOCUMENTS

| | | |
|---|---|---|
| EP | 1122598 | 8/2001 |
| EP | 1182501 | 2/2002 |
| EP | 1220033 | 7/2002 |
| GB | 1069661 | 5/1967 |
| GB | 1069991 | 5/1967 |
| GB | 1380092 | 1/1975 |
| GB | 2330556 | 4/1999 |
| JP | 53137710 | 12/1978 |
| JP | 56053089 | 5/1981 |
| JP | 56077188 | 6/1981 |
| JP | 07138517 | 5/1995 |

OTHER PUBLICATIONS

Australian Examination Report for Australian Application No. 2014266438 dated Jun. 19, 2017, 4 pages.

MARKING SYSTEM

CROSS-REFERENCE TO RELATED APPLICATIONS

This Application is a Divisional Application of U.S. application Ser. No. 14/551,647, filed on Nov. 24, 2014, which claims the benefit of priority of U.S. Provisional Application No. 61/908,556, filed Nov. 25, 2013, the disclosures of which are incorporated herein by reference in their entireties for all purposes.

FIELD OF THE INVENTION

The present invention relates generally to marking or coloring systems. Particularly, the present invention relates to marking systems that inhibit stray coloring marks from appearing on unintended surfaces, as might be particularly useful for children.

BACKGROUND

It is well known that artwork is viewed as an important developmental tool for children. For example, marking materials, such as paints and markers, are given to children for drawing, painting, and coloring purposes in order to stimulate their creativity and imagination. Of course, a significant drawback with conventional marking materials is that they tend to become very messy in use. Indeed, parents often limit the use of marking materials by children because of the possibility that household objects, such as carpets and furniture, as well as skin and clothing, would be stained by the marking materials.

Marking systems have been developed that inhibit the formation of inadvertent stains on household objects or other unintended surfaces during use. For example, one commercially-available marking system, which is described in U.S. Pat. No. 6,124,377, provides a marking composition comprising at least one color precursor in the form of a leuco dye, and a substrate provided with a coating comprising at least one color-triggering developer. Upon application of the leuco dye to the substrate, a chromophore, and hence, color, is formed. Application of the leuco dye to the substrate only causes the appearance of color in the areas of the substrate that are coated with the color-triggering developer. One drawback of this marking system is that the user can typically see and/or feel which areas of the substrate are coated, thus it is not surprising which areas will develop color. A second drawback is that artwork for printing the developer coating is typically engraved on an expensive printing cylinder, which is time-consuming and requires a high capital investment. There exists a need for products that are more efficient to manufacture, and that improve upon these marking systems so that the user cannot easily see or feel which areas of the substrate will develop color.

SUMMARY OF THE INVENTION

An embodiment of the present invention provides a deactivating ink composition suitable for use as a coating on a substrate, the deactivating ink composition comprising a first component that is capable of complexing with a Lewis acid; and a second component that inhibits penetration of a leuco dye intermediate into the substrate. The first component preferably comprises a Lewis base (e.g., triisopropanolamine) and the second component preferably comprises polyethylene glycol (e.g., Carbowax® 1450). Another embodiment of the present invention provides a substrate comprising a surface coated with a color-triggering developer and the deactivating ink composition.

Another embodiment of the present invention provides a marking system comprising (i) a substrate having a surface coated with a color-triggering developer and a deactivating ink composition; and (ii) a marking composition comprising at least one color precursor. At least one "non-color developing portion" of the surface is coated with both the color-triggering developer and the deactivating ink composition, and at least one "color-developing portion" of the surface is coated with the color-triggering developer and is not coated with the deactivating ink composition. Color development occurs at the color-developing portion(s) and does not occur at the non-color developing portion(s) upon application of the marking composition to the surface of the substrate.

Another embodiment of the present invention provides a method of using a marking system comprising applying a marking composition comprising at least one color precursor to a surface of a substrate coated with a color-triggering developer and a deactivating ink composition. The method may comprise using a marking instrument (e.g., a marker, stamp, pen, or paintbrush) to apply the marking composition to the substrate surface.

Another embodiment of the present invention provides a method of making a marking system comprising applying a deactivating ink composition to at least one portion of a substrate surface coated with a color-triggering developer. The method may comprise applying the deactivating ink composition with a flexographic plate imaged with the chosen design. The design can be printed as line art via any traditional printing process, including but not limited to gravure, flexography or lithography.

DETAILED DESCRIPTION OF THE INVENTION

The present invention relates to marking systems that inhibit the formation of inadvertent stains on household objects or other unintended surfaces during use. In particular, embodiments of the present invention relate to marking systems that provide improvements over commercially-available systems. One such marking system is described in U.S. Pat. No. 6,124,377, which is incorporated by reference herein in its entirety and for all purposes. This type of system provides a marking composition comprising at least one color precursor in the form of a leuco dye intermediate, and a substrate provided with a coating comprising at least one color-triggering developer. The leuco dye intermediate, which is sensitive to oxidation and/or acidic environments, remains colorless until reacted with a color-triggering developer provided in a coating disposed on a substrate. Examples of suitable leuco dyes include, but are not limited to, diarylphthalide dyes, fluoran dyes, indolyphthalide dyes, acylluecoazine dyes, leucoauramine dyes, spiropyrane dyes, rhodaminelactam dyes, triarylmethane dyes and chromene dyes. Preferred leuco dyes include, but are not limited to, spiro(12H-benzo(a)xanthene-12,1'(3'H)-isobenzofuran-3'-one,9-(diethylamino) (such as COPIKEM® 747), 3-[Butyl-2-methylindol-3-yl]-3-(1-octyl-2-methylindol-3-yl)-1(3H) isobenzofuranone (such as COPIKEM® 35 magenta), 2-'phenylamino-3'-methyl-6'-(dibutylamino) spiro[isobenzofuran-1(3H),9'-(9H)-xanthen]-3-one (such as COPIKEM® 34 Black), a substituted phthalide (such as COPIKEM® 14 Orange), such as COPIKEM® 7 Grape, 2'-Di(phenylmethyl)amino-6'-(diethylamino)spiro(isobenzofuran-1(3H),9'-(9H)-xanthen))-3-one (such as COPIKEM® 5 green). Products identified under the COPIKEM® trademarks are commercially available from the Hilton Davis Company, Cincinnati, Ohio.

The color-triggering developer serves as a chemical activator or initiator for the conversion of the color precursor into chromophore containing dyes that display bold and vivid colors. When the color precursor is a leuco dye intermediate, the color-triggering developer is preferably a Lewis acid. The most desirable Lewis acids for use as the color-triggering developer are zinc containing resins. Most preferably, the color-triggering developer is a zincated carboxylic resin that is dispersed in the coating. For example, the zinc acts as a Lewis acid and causes the rearrangement of the dye molecule, thereby resulting in the development of the desired chromophore. Particularly, the development of the color occurs when the color-triggering developer reacts with the leuco dye intermediate to form a highly conjugated compound thereby resulting in a chromophore of intense color. Thus, upon application of the leuco dye intermediate to the substrate, a chromophore, and hence, color, is formed.

Application of the leuco dye intermediate to the substrate only causes the appearance of color in the areas of the substrate that are coated with the color-triggering developer; uncoated areas do not exhibit any color. One drawback of the commercially-available form of this marking system is that the end user can typically see and/or feel which area(s) of the substrate are coated, thus it is not as surprising which area(s) will develop color and which ones will not. A second drawback is that artwork for printing the color-triggering developer is often engraved on an expensive printing cylinder which requires a high capital investment and takes 2-4 weeks to reengrave.

The applicant has developed a marking system which is more cost-effective to manufacture, and which provides a substrate whereby the user cannot easily see or feel which area(s) of the substrate are capable of developing color. According to one embodiment, the substrate, typically paper, is pre-coated with a color-triggering developer (as described above and in U.S. Pat. No. 6,124,377), and flexographic printing plates imaged with the desired artwork (which are more cost-effective than engraved printing cylinders and are usually processed on-site) are used to print individual sheets of the pre-coated paper with an ink that selectively deactivates area(s) of the pre-coated paper where color development is not desired. Without being bound by theory, it is believed that the deactivating ink (also referred to herein as a "deactivating ink composition") acts as a physical and chemical barrier to the development of color.

According to particular embodiments, the deactivating ink contains two components which may work synergistically to prevent color development in the applied marking composition. A first component, preferably a Lewis base, is capable of reacting and/or complexing with the color-triggering developer coated on the substrate (preferably a Lewis acid). For example, when zinc in the color-triggering developer is complexed in this manner, it cannot activate applied leuco dye intermediates. According to particular embodiments, the Lewis base comprises a nitrogen atom and at least one hydrophilic functional group (e.g., hydroxyl, carboxyl, sulfonate, etc.). A preferred Lewis base is triisopropanolamine.

A second component acts as a physical barrier to inhibit or slow down the penetration of the leuco dye intermediate(s) into the substrate. According to particular embodiments, the second component comprises an organic solvent (alcohols, polyethers, glycols, etc.), preferably polyethylene glycol. Application of the marking composition to paper coated in this fashion affords color development only where the deactivating ink has not been applied. Preferably, the overall look and feel of the final product is such that the end user cannot easily see or feel which areas of the substrate are capable of developing color, so that the marking system is more surprising and entertaining. Stated another way, those areas of the substrate that have the deactivating composition printed onto the color-triggering developer are not visibly discernible from the areas of the substrate that have only the color-triggering developer with no deactivating composition.

An embodiment of the present invention provides a deactivating ink composition suitable for use as a coating on a substrate, the deactivating ink composition comprising a first component that is capable of complexing with a Lewis acid that has been pre-coated on the substrate and a second component that inhibits penetration of a leuco dye intermediate into the substrate. According to preferred embodiments, the substrate is paper. The first component can complex with the Lewis acid to a sufficient extent such that the Lewis acid is no longer capable of activating leuco dye intermediates that are applied to the substrate. The first component preferably comprises a Lewis base, most preferably triisopropanolamine. The composition may comprise the first component in an amount of, for example, about 15 wt % to about 35 wt %, or about 20 wt % to about 30 wt %, or about 22 wt % to about 26 wt %, or about 23 wt % to about 25 wt %. The second component preferably comprises polyethylene glycol (PEG). The PEG preferably has an average molecular weight of greater than about 500 Daltons, greater than about 1,000 Daltons, or greater than about 1,200 Daltons; for example, between about 500 Daltons to about 5,000 Daltons, or between about 1,000 Daltons to about 2,000 Daltons, or between about 1,305 Daltons to about 1,595 Daltons, preferably with an average number of between about 10 and about 50 repeating oxyethylene units, or about 32.5 repeating oxyethylene units (e.g., Carbowax® 1450, also known as PEG-32). The composition may comprise the second component in an amount of, for example, about 20 wt % to about 50 wt %, or about 25 wt % to about 40 wt %, about 30 wt % to about 40 wt %, about 32 wt % to about 35 wt %.

According to particular embodiments, the deactivating ink composition further comprises water. For example, the composition may comprise about 20 wt % to about 50 wt % water, about 25 wt % to about 45 wt % water, or about 30 wt % to about 40 wt % water, or about 35 wt % to about 40 wt % water.

The deactivating ink composition may further comprise at least one additive. Examples of suitable additives include, but are not limited to, wetting agents (e.g., Tergitol® NP-9), defoamers (e.g., Surfynol® 104A), surfactants, pH adjustors (e.g., citric acid), biocides (e.g., Reputain® B30 and/or Kathon® PFM), or a combination thereof. The composition may comprise, for example, about 0.01 wt % to about 10 wt % additives, or about 0.1 wt % to about 10 wt % additives, or about 0.5 wt % to about 10 wt % additives, or about 1 wt % to about 10 wt % additives, or about 0.01 wt % to about 5 wt % additives, or about 0.1 wt % to about 5 wt % additives, or about 0.5 wt % to about 5 wt % additives, or about 1 wt % to about 5 wt % additives, or about 0.01 wt % to about 2 wt % additives, or about 0.1 wt % to about 2 wt % additives, or about 0.5 wt % to about 2 wt % additives, or about 0.01 wt % to about 1 wt % additives, or about 0.1 wt % to about 1 wt % additives.

The deactivating ink composition may further comprise at least one color dye. For example, the dye may have a yellow color that substantially matches the natural yellow color of the color-triggering developer. The composition may comprise, for example, about 0.01 wt % to about 5 wt % color dye, or about 0.1 wt % to about 5 wt % color dye, or about 0.5 wt % to about 5 wt % color dye, or about 1 wt % to about 5 wt % color dye, or about 0.01 wt % to about 2 wt % color dye, or about 0.1 wt % to about 2 wt % color dye, or about 0.5 wt % to about 2 wt % color dye, or about 0.01 wt % to about 1 wt % color dye, or about 0.1 wt % to about 1 wt % color dye.

According to particular embodiments, the deactivating ink composition comprises, consists essentially of, or consists of water, at least one Lewis base (e.g., triisopropanolamine), polyethylene glycol (e.g., with an average molecular weight between about 1,000 Daltons to about 2,000 Daltons), at least one optional additive, and at least one optional color dye. For example, the deactivating ink composition may comprise, consist essentially of, or consist of about 20 wt % to about 50 wt % water; about 15 wt % to about 35 wt % of the Lewis base; about 20 wt % to about 50 wt % of the polyethylene glycol; about 0.01 wt % to about 5 wt % optional additive(s); and about 0.01 wt % to about 5 wt % optional color dye(s).

Another embodiment of the present invention provides a substrate (preferably paper) coated with a color-triggering developer (as described herein and in U.S. Pat. No. 6,124,377) and a deactivating ink composition of the present invention. According to particular embodiments, only one surface of the substrate (e.g., one side of the paper) is coated with the color-triggering developer and deactivating ink composition, and the opposite side of the substrate is not coated with either the color-triggering developer or the deactivating ink composition. Alternatively, both surfaces of the substrate may be coated with the color-triggering developer and deactivating ink composition.

According to preferred embodiments, an entire surface of the substrate (or substantially an entire surface of the substrate) is coated with the color-triggering developer and at least one portion of the same surface of the substrate is coated with both the color-triggering developer and the deactivating ink; thus, at least one portion of the surface of the substrate is not coated with the deactivating ink. Stated another way, at least one portion of the substrate surface is coated with both the color-triggering developer and the deactivating ink composition, and at least one other portion of the substrate is coated with the color-triggering developer but is not coated with the deactivating ink composition. The portion(s) which do not comprise any of the deactivating ink composition is/are preferably in the shape of one or more designs that develop color upon application of the marking composition described herein and in U.S. Pat. No. 6,124,377. Preferably, the entire surface of the coated substrate surface is substantially flat, such that a user cannot easily see or feel which portion(s) of the substrate comprise both the color-triggering developer and the deactivating ink composition. Thus, the portion(s) of the substrate surface comprising both the color-triggering developer and the deactivating ink composition are not raised any higher off of the substrate than the portion(s) of the substrate surface that comprise no coating or that comprise the color-triggering developer with no deactivating ink composition.

Another embodiment of the present invention provides a marking system comprising (i) a substrate, preferably paper, having a surface coated with a color-triggering developer (as described herein and in U.S. Pat. No. 6,124,377) and a deactivating ink composition (as described herein); and (ii) a marking composition comprising at least one color precursor (as described herein and in U.S. Pat. No. 6,124,377). As described above, at least one "non-color developing portion" of the surface is coated with both the color-triggering developer and the deactivating ink composition, and at least one "color-developing portion" of the surface is coated with the color-triggering developer and is not coated with the deactivating ink composition. Color development occurs at the color-developing portion(s) and does not occur at the non-color developing portion(s) upon application of the marking composition to the surface of the substrate. According to particular embodiments, a majority of the substrate surface, more preferably the entire substrate surface or substantially the entire substrate surface, has been pre-coated with the color-triggering developer, and the deactivating ink composition has subsequently been printed onto one or more portions of the pre-coated substrate applying the deactivating ink composition with a flexographic plate imaged with the chosen design. The design can be printed as line art via any traditional printing process, including but not limited to gravure, flexography or lithography.

According to particular embodiments, the system comprises at least one marking instrument for applying the marking composition to the substrate to form at least one color mark. The marking composition may be contained within the marking instrument; for example, the marking composition may be in the form of an ink that is contained within a marker. Non-limiting examples of marking instruments include markers, pencils, crayons, stamps, stamp pads, pens, paintbrushes, and the like. Alternatively, the marking composition can be in the form of paint, which can be applied with a paintbrush or a person's hands (e.g., "fingerpaint").

According to particular embodiments, a method of using a marking system of the present invention comprises applying a marking composition comprising at least one color precursor to a substrate coated with a color-triggering developer and a deactivating ink composition. The method may further comprise using a marking instrument to apply the marking composition to the substrate.

The following example is provided to describe the invention in greater detail and is intended to illustrate, not limit, the invention.

EXAMPLE

While only one composition is set forth in Table 1 below, alternative compositions will be apparent to those skilled in the art. Such artisans will be able to modify the compositions with an eye toward the desired performance properties and intended use.

TABLE 1

Deactivating Ink Formula

| Component | wt % | Property/Function |
|---|---|---|
| Deionized Water | 38.7% (20-50%) | vehicle |
| Triisopropanolamine | 24.7% (15-35%) | Lewis base |
| Carbowax ® 1450 (polyethylene glycol) | 33.0% (20-50%) | diluent/synergist |
| Tergitol ® NP-9 | 0.50% (0.01-2%) | Additive (wetting agent) |
| Surfynol ® 104A | 0.05% (0.01-2%) | Additive (defoamer) |
| Reputain ® B30 | 0.12% (0.01-2%) | Additive (biocide) |
| Kathon ® PFM | 0.06% (0.01-2%) | Additive (biocide) |

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed is:

1. A deactivating ink composition suitable for use as a coating on a substrate, the deactivating ink composition comprising:
    a Lewis base that is capable of complexing with a Lewis acid that has been coated on the substrate, wherein the Lewis base comprises triisopropanolamine; and
    an organic solvent that inhibits penetration of a leuco dye intermediate into the substrate.

2. The deactivating ink composition of claim 1, wherein the organic solvent comprises polyethylene glycol.

3. The deactivating ink composition of claim 1 further comprising water.

4. The deactivating ink composition of claim 1 further comprising at least one additive selected from the group consisting of surfactants, pH adjustors, biocides, and a combination thereof.

5. The deactivating ink composition of claim 1 further comprising at least one color dye.

6. The deactivating ink composition of claim 1, wherein the composition comprises about 20 wt % to about 50 wt % water.

7. The deactivating ink composition of claim 1, wherein the composition comprises about 15 wt % to about 35 wt % of the Lewis base.

8. The deactivating ink composition of claim 1, wherein the composition comprises about 20 wt % to about 50 wt % of the organic solvent.

9. The deactivating ink composition of claim 1, wherein the composition comprises about 0.01 wt % to about 10 wt % additives.

10. The deactivating ink composition of claim 1, wherein the composition comprises about 30 wt % to about 40 wt % water; about 20 wt % to about 30 wt % of the Lewis base; about 30 wt % to about 40 wt % of the organic solvent; and about 1 wt % to about 5 wt % optional additives.

* * * * *